(12) United States Patent
Sato et al.

(10) Patent No.: US 11,227,695 B2
(45) Date of Patent: Jan. 18, 2022

(54) CORE CATCHER AND BOILING WATER NUCLEAR PLANT USING THE SAME

(71) Applicant: Kabushiki Kaisha Toshiba, Minato-ku (JP)

(72) Inventors: Takashi Sato, Yokohama (JP); Keiji Matsumoto, Yokohama (JP); Masato Yamada, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 156 days.

(21) Appl. No.: 16/668,733

(22) Filed: Oct. 30, 2019

(65) Prior Publication Data

US 2020/0126679 A1 Apr. 23, 2020

Related U.S. Application Data

(62) Division of application No. 15/616,423, filed on Jun. 7, 2017, now Pat. No. 10,497,481.

(30) Foreign Application Priority Data

Jun. 9, 2016 (JP) .................................. 2016-115241

(51) Int. Cl.
*G21C 9/016* (2006.01)
*G21C 15/12* (2006.01)
(Continued)

(52) U.S. Cl.
CPC ............. *G21C 9/016* (2013.01); *G21C 15/12* (2013.01); *G21C 15/18* (2013.01); *G21C 1/084* (2013.01); *G21C 15/26* (2013.01); *Y02E 30/30* (2013.01)

(58) Field of Classification Search
CPC ...................................................... G21C 9/016
See application file for complete search history.

(56) References Cited

U.S. PATENT DOCUMENTS 5,343,506 A   8/1994  Artnik
6,353,651 B1 * 3/2002  Gou ........................ G21C 9/016
                                                        376/280
(Continued)

FOREIGN PATENT DOCUMENTS

EP       1 988 551 A1      11/2008
EP       3067895 A1 *  9/2016  ............. G21C 15/18
(Continued)

OTHER PUBLICATIONS

Extended European Search Report dated Oct. 30, 2017 in Patent Application No. 17174089.7.

*Primary Examiner* — Sharon M Davis
(74) *Attorney, Agent, or Firm* — Oblon, McClelland, Maier & Neustadt, L.L.P.

(57) ABSTRACT

According to an embodiment, a core catcher has: a main body including: a distributor arranged on a part of a base mat in the lower dry well, a basin arranged on the distributor, cooling channels arranged on a lower surface of the basin connected to the distributor and extending in radial directions, and a riser connected to the cooling channels and extending upward; a lid connected to an upper end of the riser and covering the main body; a cooling water injection pipe open, at one end, to the suppression pool, connected at another end to the distributor; and chimney pipes connected, at one end, to the riser, another end being located above the upper end of the riser and submerged and open in the pool water.

6 Claims, 16 Drawing Sheets

(51) Int. Cl.
*G21C 15/18* (2006.01)
*G21C 1/08* (2006.01)
*G21C 15/26* (2006.01)

(56) References Cited

U.S. PATENT DOCUMENTS 7,558,360 B1 7/2009 Gamble et al.
8,358,732 B2 1/2013 Sato et al.

FOREIGN PATENT DOCUMENTS

| | | |
|---|---|---|
| EP | 3 166 114 A1 | 5/2017 |
| JP | 2005-195595 | 7/2005 |
| JP | 2008-241657 | 10/2008 |
| JP | 2010-237070 A | 10/2010 |
| JP | 2015-190876 | 11/2015 |
| WO | WO 2016/002224 A1 | 1/2016 |

* cited by examiner

CORE CATCHER AND BOILING WATER NUCLEAR PLANT USING THE SAME

CROSS-REFERENCE TO RELATED APPLICATION

This application is a divisional of U.S. application Ser. No. 15/616,423, filed Jun. 7, 2017, which is based upon and claims the benefit of priority from Japanese Patent Application No. 2016-115241, filed Jun. 9, 2016; the entire content of which is incorporated herein by reference.

FIELD

The embodiments of the present invention relate to a core catcher and a boiling water nuclear plant using the same.

BACKGROUND

The core catcher is safety equipment designed to cope with severe accidents that may occur in the nuclear plant. Even if the molten core falls through the bottom of the reactor pressure vessel onto the floor of the containment vessel of the nuclear reactor, the core catcher receives the core debris (i.e., residues of the molten core), and keeps cooling the containment vessel of the nuclear reactor, thereby preserving the safety of the containment vessel and limiting the release of radioactive substances. As the radioactive substances existing in the core debris decay, they keep generating heat that amounts to about 1% of the nuclear reactor output power. Without cooling means, the core debris may melt through the base mat concrete of the containment vessel, and a great amount of radioactive substances may be released into the environment. To prevent such an event, it is planned that a core catcher having cooling channels should be installed in the boiling water reactor (BWR).

The core catcher of the European ABWR (EU-ABWR), for example, has radial cooling channels. In the cooling channels, the cooling water in the upper part of the core catcher is recirculated, efficiently removing the decay heat generated in the debris. This recirculation of cooling water is natural circulation, and does not require active pumps. Further, the cooling water can be circulated uniformly in the cooling channels because the cooling channels extend in radial directions.

Taking the conventional ABWR and the conventional European ABWR (EU-ABWR) for example, the containment vessel and core catcher used in the conventional boiling water reactor (BWR) will be outlined with reference to FIG. 9 to FIG. 16.

(ABWR Shown in FIG. 9)

FIG. 9 is an elevational, cross-sectional view of a containment vessel of a conventional ABWR. FIG. 10 is a plan view of the containment vessel of the conventional ABWR. As shown in FIG. 9, a core 1 is provided in a reactor pressure vessel 2. The reactor pressure vessel 2 is provided in the containment vessel 3. The containment vessel 3 is shaped like a hollow cylinder (see FIG. 10).

The interior of the containment vessel 3 is partitioned into a dry well 4 and a wet well 5. The dry well 4 and the wet well 5 each constitutes a part of the containment vessel 3. The wet well 5 has a suppression pool 6 in it. The suppression pool 6 has a normal water level 6a of about 7 m. The suppression pool 6 holds pool water in a large amount, about 3,600 m³. Above the suppression pool 6, a wet-well gas phase 7 is provided. The wet-well gas phase 7 is about 12.3 m high.

The outer wall parts of the dry well 4 and the wet well 5 are integrated, forming the hollow cylindrical outer wall 3a of the containment vessel 3. The ceiling part of the dry well 4 is a flat plate. This part is called a top slab 4a of the dry well 4.

In the case of the ABWR, the containment vessel 3 is made of reinforced concrete. Therefore, the containment vessel 3 of the ABWR is called "reinforced-concrete containment vessel (RCCV)." To make the containment vessel gastight, steel liners (not shown) are laid on the inner surfaces of the containment vessel. FIG. 9 and FIG. 10 show an example of an RCCV. As seen from FIG. 10, the outer wall 3a of the containment vessel 3 is shaped like a hollow cylinder. The bottom part of the RCCV is constituted by a part 99a of a base mat 99. The RCCV is made of reinforced concrete. The base mat 99 constitutes the bottom part of the reactor building 100. It is proposed that the base mat 99 could be made of steel concrete composite (SC composite) in the future.

As shown in FIG. 9, the reactor pressure vessel 2 is supported by a hollow cylindrical pedestal 61 through a vessel skirt 62 and a vessel support 63. The pedestal 61 is constituted by a hollow cylindrical sidewall (i.e., pedestal sidewall 61a). The pedestal sidewall 61a has a thickness of, for example, 1.7 m. The pedestal sidewall 61a is made of concrete, and has inner and outer layers made of steel. The outer layer made of steel is strong enough to support, almost by itself, the weight of the reactor pressure vessel 2. The bottom of the pedestal sidewall 61a contacts the base mat 99, and is supported by the base mat 99.

Below the reactor pressure vessel 2 and the vessel skirt 62 in the dry well 4, a space is formed, surrounded by the hollow cylindrical pedestal sidewall 61a and the part 99a of the base mat 99. This space is called pedestal cavity 61b. In the RCCV of the ABWR, the pedestal sidewall 61a constitutes a boundary wall between the wet well 5 and the dry well 4. Particularly, the space of the pedestal cavity 61b is called lower dry well 4b. The height from the floor of this lower dry well 4b to the bottom of the reactor pressure vessel 2 is about 11.55 m. The upper space in the dry well 4, excluding the lower dry well 4b, is called upper dry well 4c.

(Lower Dry Well Part Shown in FIG. 11)

FIG. 11 is an enlarged view of the lower dry well (lower DW) 4b and peripherals. On the bottom of the lower dry well 4b, a concrete floor 67 is provided, having a thickness of about 1.6 m. The concrete floor 67 has sumps 68. The sumps 68 have a depth of about 1.3 m. The sumps 68 are configured to collect leakage water therein if the coolant leaks from the pipes or components connected to the reactor pressure vessel 2. The water levels in the sumps 68 are monitored in order to detect the leakage. Two sumps 68, a high conductivity waste sump 68a and a low conductivity waste sump 68b, are provided (see FIG. 10), but only one sump is shown in FIG. 9 and FIG. 11. Each sump 68 has a corium shield (i.e., a lid for preventing inflow of debris; not illustrated), which prevents the in-flow of core debris in case a severe accident occurs. Various types of corium shields have been devised, one of which is disclosed in Japanese Patent Application Laid-Open Publication 2015-190876, the entire content of which is incorporated by reference.

In the lower dry well 4b, there are provided control rod drives 10 and a control rod drive handling equipment 11. The control rod drives 10 are connected to the bottom of the reactor pressure vessel 2. The control rod drive handling equipment 11 is arranged below the control rod drive 10. About 205 control rod drives 10 are used in all. The control rod drive handling equipment 11 takes the control rod drives 10, one by one, from the reactor pressure vessel 2, rotates each control rod drive 10 to a horizontal position and moves up the same again, so that the control rod drives 10 may be carried out of the containment vessel. The control rod drive handling equipment 11 is therefore indispensable for the maintenance of the nuclear reactor. The control rod drive handling equipment 11 can rotate, in its entirety, in the horizontal direction to be positioned with respect to each of the all control rod drives 10. This is why the upper surface of the control rod drive handling equipment 11 is also called a turntable 11a.

The control rod drive handling equipment 11 has a height of about 4.6 m, and can hold the control rod drives 10 in it. On the turntable 11a operators may stand to perform maintenance work. Therefore, the lower ends of the control rod drives 10 are spaced from the turntable 11a by about 2.2 m. On the other hand, the lower end of the control rod drive handling equipment 11 is spaced away from the concrete floor 67 by about 10 cm only. Thus, a gap is scarcely provided between the concrete floor 67 and the lower end of the control rod drive handling equipment 11. The lower end of the control rod drive handling equipment 11 is about 1.7 m above the upper end of the part 99b of the base mat 99. The upper surface of the concrete floor 67 is about 1.6 m above the upper end of the part 99b of the base mat 99. No space is therefore available to arrange the core catcher, and the core catcher is not arranged there. In the conventional ABWR, the lower dry well 4b holds the control rod drives 10 and the control rod drive handling equipment 11, and cannot accommodate a core catcher.

It is proposed that the lower dry well 4b should be used as a space for the core catcher and the device (i.e., hopper) associated with the core catcher (see, for example, Patent Application Laid-Open Publication 2008-241657, the entire content of which is incorporated by reference). In practice, however, the lower dry well 4b of the conventional ABWR has no extra clearance, and a core catcher (disclosed in Patent Application Laid-Open Publication 2008-241657) cannot be arranged there.

The size and shape of the containment vessel of the conventional ABWR are standardized as described above. The height from the upper end of the part 99b of the base mat 99 to the lower end of the top slab 4a (i.e., total height of the containment vessel 3) is about 29.5 m.

The dry well 4 and the suppression pool 6 are connected by LOCA vent pipes 8. Ten LOCA vent pipes 8, for example, are arranged (see FIG. 10), though only two LOCA vent pipes are shown in FIG. 9 and FIG. 11. Each of the LOCA vent pipes 8 has a plurality of horizontal vent pipes 8a submerged in the pool water and has openings in the pool water. In the case of the RCCV, three horizontal vent pipes 8a are provided for each of the LOCA vent pipes 8 and extend in the vertical direction. The uppermost horizontal vent pipe has its upper end located at the height of about 3.85 m from the part 99b of the base mat 99.

If an accident occurs, the suppression pool 6 is used as water source for the safety system such as an emergency core cooling system. Even in such a case, the pool keeps holding water in such an amount that the water level never falls below the level of about 0.61 m to 1.0 m higher than the upper end of the uppermost horizontal vent pipe 8a. This measure is taken in order that the horizontal vent pipe 8a can keep a condensation function. Hence, in the event of an accident, the water in the suppression pool 6 can be maintained at a level of about 4.46 m to 4.85 m at the lowest.

In the RCCV, the LOCA vent pipes 8 are arranged, extending in the interior of the pedestal sidewall 61a shaped like a hollow cylinder. The pedestal sidewall 61a is therefore called "vent wall 61c" if used in the case of the RCCV. As specified above, the vent wall 61c is about 1.7 m thick and made of concrete, and its inner and outer layers are made of steel. The outer layer made of steel can support, by itself, the weight of the reactor pressure vessel 2. The concrete part of the vent wall 61c reinforces the pedestal 61 and has the function of holding the LOCA vent pipes 8. The LOCA vent pipes 8 and the pedestal 61 constitute a part of the containment vessel 3.

One of the methods of maintaining, in the suppression pool 6, water much enough to keep the water temperature low to cope with a severe accident is to supply water to the pool from an external water source. Various means (not shown) are available for supplying water to the suppression pool, such as a portable pump, a fire-fighting pump and an alternate water supply pump.

The design pressure of the containment vessel 3 is about 3.16 kg/cm$^2$ (0.310 MPa in terms of gauge pressure). The hollow cylindrical outer wall 3a and the top slab 4a are made of reinforced concrete and have thickness of about 2 m and a thickness of about 2.4 m, respectively. Their inner surfaces are lined with steel liners (not shown) for the purpose of limiting the leakage of radioactive substances. The base mat 99 has a thickness of about 5 m and is made of reinforced concrete, too.

The containment vessel 3 has a design leakage rate of about 0.4% per day. Recently it is proposed that the hollow cylindrical outer wall 3a and the top slab 4a of the containment vessel 3 could be made of steel concrete composite (SC composite), not reinforced concrete. The SC composite comprises two steel frames secured to each other with ribs and concrete filled in the gap between the steel frames. The SC composite is advantageous in that rebars need not be laid and that it can be modularly assembled. Further, as the SC composite is stronger, raising the design pressure of the containment vessel 3 even higher is possible. An example of employing an SC composite in nuclear plants is the shield building of the AP1000 (registered trademark) of Westinghouse, Inc.

(Eu-Abwr Shown in FIGS. 12 and 13)

How an EU-ABWR core catcher is installed will be explained with reference to FIG. 12 and FIG. 13. FIG. 13 is an enlarged view of the lower dry well 4b.

As shown in FIG. 12 and FIG. 13, a core catcher 30 is mounted on the part 99b of the base mat 99 provided at the lower part of the lower dry well 4b. The core catcher 30 is arranged eliminating the concrete floor 67 (FIG. 9 and FIG. 11) about 1.6 m thick provided in the conventional ABWR. Further, in the EU-ABWR, the lower dry well 4b is about 2.1 m higher than in the ordinary ABWR, and the space for the core catcher 30 has a height of about 3.7 m including the thickness of the eliminated concrete floor, i.e., 1.6 m. The core catcher 30 has height of about 2.45 m.

Furthermore, a lid 31 is arranged above the core catcher 30. The upper end of the lid 31 lies about 3.6 m above the upper end of the base mat 99. The lid 31 has a sump 68. The sump 68 is about 1.3 m deep. The lid 31 is positioned so high that the sump 68 does not interfere with the core catcher 30. The lower end of the control rod drive handling equipment 11 is located about 3.7 m from the upper end of the base mat 99. Hence, the core catcher 30 having a height of about 2.45 m can be arranged together with the lid 31 having a height of about 3.6 m.

(Fusible Valve)

In the pedestal cavity 61b, fusible valves 64 and lower dry well flooding pipes 65 are provided to cope with a core meltdown that might occur. The lower dry well flooding pipes 65 extend from the LOCA vent pipes 8, penetrate the pedestal sidewall 61a and are connected to the fusible valve 64. One fusible valve 64 and one lower dry well flooding pipe 65 are provided on each of the LOCA vent pipes 8. Each fusible valve 64 has a plug part made of low-melting-point material, and opens by melting the plug part if the temperature in the lower dry well 4b rises to about 260 degrees centigrade.

If a core meltdown occurs, the corium melts through the bottom of the reactor pressure vessel 2, falls down into the pedestal cavity 61b, melts through the control rod drive handling equipment 11, and is held in the core catcher 30 provided at the bottom of the pedestal cavity 61b. Accordingly, as the temperature abruptly rises in the pedestal cavity 61b, the fusible valves 64 open. The cooling water in the LOCA vent pipes 8 then flows through the lower dry well flooding pipes 65 into the pedestal cavity 61b, flooding and cooling the corium on the core catcher 30. The cooled corium partly becomes solidified core debris. The cooling water in the LOCA vent pipes 8 are supplied from the suppression pool 6 through the horizontal vent pipes 8a.

The configuration of the core catcher of the conventional EU-ABWR will be described with reference to FIG. 14 to FIG. 16. FIG. 14 is a sectional view showing the configuration of the core catcher of the conventional EU-ABWR. FIG. 15 is a plan view showing the configuration of the core catcher of the conventional EU-ABWR. FIG. 16 is a perspective view of one of the cooling channels used in the core catcher of the conventional EU-ABWR.

(Configuration of FIG. 14)

As shown in FIG. 14, the core catcher 30 is provided on the bottom of the lower dry well 4b surrounded by the pedestal sidewall 61a and the part 99b of the base mat 99. The core catcher 30 is constituted by a dish-shaped basin 32. The basin 32 is made of steel and has a thickness of about 1 cm. In some cases, the thickness of the basin 32 may be about 5 cm, about 10 cm, or the like, depending on the strength the basin 32 must have. A refractory layer 33 is laid on the basin 32, and a sacrificial layer 34 is laid on the refractory layer 33. The refractory layer 33 is composed of refractory bricks glued together, and has a thickness of about 17.5 cm. The refractory bricks may be made of alumina (aluminum oxide) and zirconia (zirconium oxide).

The sacrificial layer 34 is made of concrete and has thickness of about 5 cm. If core debris falls on to it, the sacrificial layer 34 is eroded with the heat of the core debris, preventing the refractory layer 33 from being heated over the allowable temperature, until the cooling water is supplied from the fusible valve 64 and starts cooling the core debris. The peripheral part of the basin 32 is connected to a circular annular riser sidewall 38a having an axis extending in the vertical direction. Around the riser sidewall 38a, a circular annular downcomer sidewall 39a is provided and spaced from the riser sidewall 38a by about 10 cm. The upper edge of the downcomer sidewall 39a lies at a height of about 2.45 m from the upper end of the part 99b of the base mat 99. The lid 31 is provided above the core catcher 30. The lid 31 lies at a height of about 3.6 m above the part 99b of the base mat 99.

The lid 31 is configured to fall onto the sacrificial layer 34 immediately if the molten core falls from above. Thereafter, the lid 31 melts due to the high temperature of the core debris and becomes part of the debris. Below the basin 32, many radial cooling channels 35 are provided (see FIG. 15). The cooling channels 35 incline at about 10 degrees. The cooling channels 35 have a length of about 4 m. The cooling channels 35 are defined by many channel sidewalls (ribs) 35a provided below the basin 32 (see FIG. 15 and FIG. 16). The number of cooling channels 35 used is, for example, 16, and may be changed as needed. The channel sidewalls 35a perform the function of cooling fins and ribs supporting the basin 32. The channel sidewalls 35a are made of metal having high thermal conductivity, such as steel or copper.

A distributor 36 shaped like a hollow cylinder and having a vertical axis is provided at the center of the radial cooling channels 35. The diameter of the distributor 36 is, for example, about 2 m. The diameter of the distributor 36 may be changed if necessary. To the distributor 36, the channel inlets 35b of the cooling channels 35 are connected. The cooling water can therefore be uniformly supplied to all cooling channels 35 from the distributor 36. The lower end of the distributor 36 is closed by a bottom plate 36a. The bottom plate 36a contacts the part 99b of the base mat 99. In the distributor 36, a distributor pillar 36b is provided as shown in FIG. 14. Alternatively, two or more distributor pillars may be provided as needed. The distributor pillar 36b contacts the basin 32, whereby the distributor 36 bears a part of the weight of the basin 32.

The outlet ports of the radial cooling channels 35 are connected to a riser 38 that guides the cooling water upward in the vertical direction. The riser 38 is a flow passage provided between the riser sidewall 38a and the downcomer sidewall 39a, and has a width of about 10 cm. The upper end of the riser 38, i.e., riser outlet 38b, opens in the upper part of the core catcher 30. The cooling water rises in the riser 38 and flows through the riser outlet 38b into the upper part of the core catcher 30.

Further, a circular annular downcomer 39 is provided, surrounding the riser 38. The downcomer 39 is a flow passage provided between the downcomer sidewall 39a and the pedestal sidewall 61a and has a width of about 30 cm. The upper end of the downcomer 39 opens in the upper part of the core catcher 30. The downcomer 39 extends down to the bottom of the lower dry well 4b and is connected to the cooling-water inlet ports 37a of cooling water injection pipes 37. Each of the cooling water injection pipes 37 has a cooling-water outlet port 37b, which is connected to the sidewall 36c of the distributor 36.

In the configuration described above, the cooling water accumulated in the upper part of the core catcher 30 flows down again in the downcomer 39, reaches the distributor 36 through the cooling water injection pipes 37, and is used in the cooling channels 35. Thus, the cooling water in the upper part of the core catcher 30 is circulated again by the downcomer 39. The basin 32, the cooling channels 35, the distributor 36 and the cooling water injection pipes 37 are made watertight, and the cooling water would not leak from them.

If the fusible valves 64 are melted with the heat generated in the core debris, the cooling water that floods the core debris existing above the basin 32 and cools the core debris is supplied from the LOCA vent pipes 8 through the lower dry well flooding pipes 65. Until the core debris becomes flooded by the cooling water, the sacrificial layer 34 protects the refractory layer 33 and the basin 32 from overheating, while the sacrificial layer 34 is melting.

The main body 30a of the core catcher 30 is composed of the basin 32, the distributor 36, the cooling channels 35 and the riser 38. The refractory layer 33 and the sacrificial layer 34 have the function of protecting the main body 30a of the core catcher 30. The downcomer 39 and the cooling water injection pipes 37 have the function of circulating the cooling water and supplying the cooling water to the main body 30a.

(Configuration of FIG. 15)

FIG. 15 is a plan view of the core catcher used in the conventional EU-ABWR, specifying the positions of the cooling channels 35 of the core catcher. As shown in FIG. 15, the cooling channels 35 extend from the distributor 36 in radial directions. The cooling channels 35 are partitioned, one from another, by the channel sidewalls (ribs) 35a. Each channel sidewall 35a has an opening (not shown). In some case, the cooling water can flow from one cooling channel to another through the opening made in the channel sidewall 35a. More channel sidewalls (ribs) 35a may be provided in order to strengthen the peripheral part of the core catcher and to increase the number of heat transfer fins (see U.S. Pat. No. 8,358,732, the entire content of which is incorporated by reference).

(Configuration of FIG. 16)

FIG. 16 is a perspective view illustrating the configuration of the cooling channels 35 used in the core catcher of the conventional EU-ABWR. In FIG. 16, the thicknesses of the walls are not shown.

Each cooling channel 35 is composed of a part 32a of the basin 32, a channel sidewall 35a, and a channel bottom wall 35c, and is shaped like a fan. The cooling channel 35 inclines, gradually upward to the outer circumference. The angle of inclination is about 10 degrees. The channel inlet 35b of the cooling channel 35 is connected to the sidewall 36c of the distributor 36. The other end of the cooling channel 35 is connected to the riser 38. The riser 38 is composed of a riser sidewall 38a, a riser rib 38c, and a downcomer sidewall 39a.

The cooling water flows into the cooling channels 35 through the channel inlets 35b, is heated with the heat generated by the core debris, rises in the riser 38, and flows into the upper part of the core catcher 30 through the riser outlet 38b. Thereafter, again, the cooling water flows down through the downcomer 39, then flows from the cooling-water inlet port 37a into the cooling water injection pipe 37, and further flows from the cooling-water outlet port 37b into the distributor 36 (see FIG. 14 and FIG. 15). The cooling water supplied into the distributor 36 is circulated again in the cooling channels 35.

The drive force recirculating the cooling water results from the water head of the cooling water in the downcomer 39, which is about 2.45 m high. In order to acquire this drive force, the core catcher of the conventional EU-ABWR has a height of about 2.45 m except the lid 31. The space below the channel bottom wall 35c is filled with concrete, embedding the cooling water injection pipe 37 therein. The channel bottom wall 35c can thereby withstand the load applied to the cooling channel 35. In some cases, a support member such as a rib may be used to support the channel bottom wall 35c, instead of filling the space with concrete.

(Disadvantages of the Prior Art)

In the containment vessel 3 of the EU-ABWR, the lower dry well 4b has a height about 2.1 m greater than the value used in the conventional ABWR. Hence, the levels of the reactor pressure vessel 2 and the core 1 are about 2.1 m higher than the conventional ABWR. This reduces the seismic resistance. The reduction of seismic resistance is not so problematic in, for example, Europe where earthquakes are not severe, but should be avoided in a country, such as Japan, which suffers from severe earthquakes. Further, the total height of the containment vessel 3 increases by about 2.1 m, and the total height of the reactor building 100 increases by about 2.1 m, too. This increases the amount of concrete used and worsens the economy.

The containment vessel 3 of the EU-ABWR has a total height of about 31.6 m, from the upper end of the part 99b of the base mat 99 to the lower end of the top slab 4a. Accordingly, the core catcher 30 influences not only the lower dry well 4b, but also the entire plant including the containment vessel 3 and the reactor building 100.

One of the methods of avoiding such a problem is to dig down the part 99b of the base mat 99, i.e., bottom of the lower dry well 4b, by about 2.1 m and put the core catcher 30 therein. The rebars that have been arranged in the conventional part 99b of the base mat 99, that is digged down, are to be cut and removed. In this case, however, the configuration of the base mat 99 becomes complicated, causing longer construction time and reducing the strength of the base mat 99 against earthquakes.

In the containment vessel 3 of the conventional ABWR, the height of the lower dry well 4b is not increased about 2.1 m, unlike in the EU-ABWR. In view of the construction schedule and the structure strength, it is undesirable to dig down the part 99b of the base mat 99. Hence, if a gap of about 10 cm is secured between the core catcher 30 and the lower end of the control rod drive handling equipment 11, the height of the space for accommodating the core catcher 30 is limited to about 1.6 m, because this space is provided by removing a part of the concrete floor 67. As described above, the core catcher 30 of the EU-ABWR is about 2.45 m high and the upper end of the lid 31 is about 3.6 m high. Consequently, the core catcher 30 cannot be disposed in the ABWR core catcher space having a height of about 1.6 m.

The core catcher 30 can be disposed in the ABWR core catcher space about 1.6 m high if the cooling channels 35 are inclined less, thereby reducing the thickness of the basin 32 and the height of the distributor 36 is also reduced, and so on. In such a case, however, the height of the downcomer 39 decreases from about 2.45 m to about 1.6 m. The height of the downcomer 39 determines the water head that is the drive force for circulating the water in the upper part of the core catcher 30 in the cooling water injection pipes 37, the distributor 36, the cooling channels 35 and the risers 38. Therefore, if the height of the downcomer 39 decreases to about 1.6 m, the flow rate of the cooling water flowing in the radial cooling channels 35 inevitably decreases, and the decay heat generated in the core debris cannot be sufficiently removed.

The flow rate of recirculating the cooling water in the upper part of the core catcher 30 by the downcomer 39 is determined by the density difference between the cooling water in the radial cooling channels 35 and the riser 38, and the cooling water in the downcomer 39. The lower the temperature of the cooling water in the upper part of the core catcher 30 flowing into the downcomer 39, the larger the density difference will be. Generally speaking, however, the upper part of the core catcher 30 holds the hottest core debris, which heats the cooling water. It is therefore physically difficult to keep the cooling water flowing into the downcomer 39 at low temperature. Accordingly, the cooling water in the upper part of the core catcher 30 is heated to a high temperature as time passes, though it remains at low temperature immediately after the core debris has fallen. Consequently, there is a problem that the heated cooling water will impede a sufficient natural circulation flow rate.

Since the cooling water recirculated by the downcomer 39 contacts the core debris existing in the upper part of the core catcher 30, part of the core debris may be released, flow into the downcomer 39 and move to the lower part of the core catcher 30. If this happens, the core catcher 30 would lose the function of holding and cooling the core debris. To prevent this, a filter is arranged in the opening made in the downcomer 39. The filter may be clogged with the loose parts scattered in the event of a severe accident. The core debris may melt through the bottom of the reactor pressure vessel 2, and may then fall onto the upper part of the core catcher 30. Accordingly in this process, the thermal insulators and such might become loose parts. Once the filter has been clogged with the loose parts, the cooling water may not be recirculated in a sufficient flow rate.

In the conventional core catcher 30, the cooling water does not exist in the cooling channels 35 during the normal operation of the plant. If the core debris falls, raising the temperature in the lower dry well 4b and melting the fusible valves 64, the water in the LOCA vent pipes 8 submerges the core catcher 30 and the core debris, flows down in the downcomer 39, passes through the cooling water injection pipe 37 and distributor 36, and cools the cooling channels 35. Therefore, there is a time lag after the falling of the core debris until the cooling channels 35 start cooling the basin 32. During this time lag, the sacrificial layer 34 and the refractory layer 33 prevent the overheating of the basin 32. However, if the impact of the falling core debris damages the sacrificial layer 34 and the refractory layer 33, the core debris may contact the basin 32 directly and may melt a part of the basin 32.

An object of the present embodiments is to provide a thin core catcher which has a main body about 1.6 m or less high and can be arranged in a lower dry well of a conventional ABWR without interfering with the control rod drive handling equipment. Another object of the present embodiments is to provide a core catcher which keeps cooling water in the cooling channels during normal operation and enables cooling channels to achieve cooling immediately if a sever accident occurred and core debris fell onto it. Yet another object of the present embodiments is to provide a thin core catcher which can, despite its small thickness, preserve the flow rate of cooling water flowing in the cooling channels by means of natural circulation. Yet another object of the present embodiments is to provide a core catcher in which the cooling water on the upper surface is not recirculated in the cooling channels, preventing the core debris and loose parts from flowing into the cooling channels.

DETAILED DESCRIPTION

Figure 1:
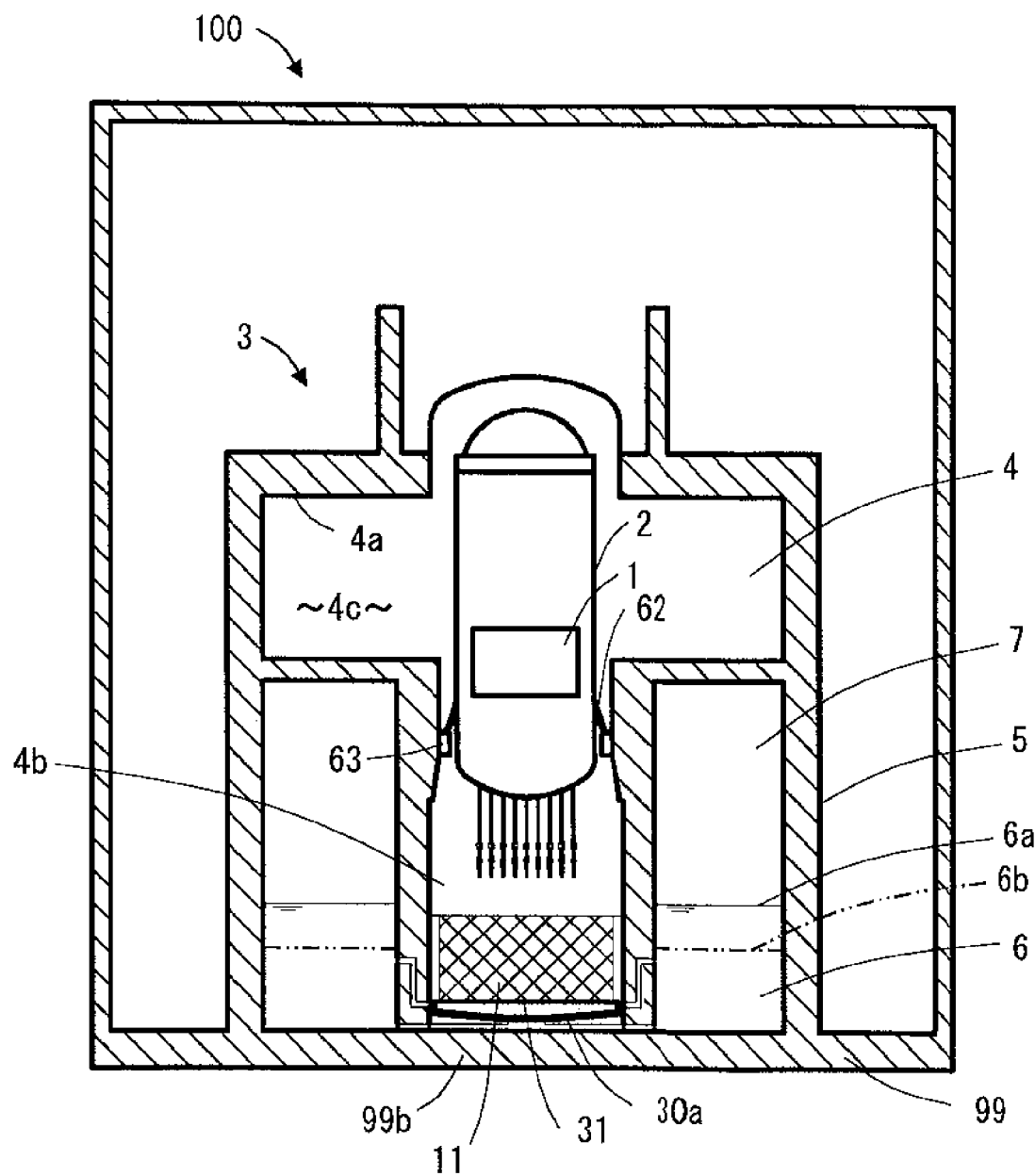
FIG. 1 is an elevational cross-sectional view showing a situation where an embodiment of a core catcher according to the present invention is arranged in a nuclear plant.

According to an embodiment, there is presented a core catcher for use in a boiling water nuclear plant which has: a base mat; a reactor building built on a part of the base mat; a containment vessel provided in the reactor building, built on the base mat and having a total height of not exceeding 29.5 m to a lower end of a top slab; a core; a reactor pressure vessel holding the core; a dry well constituting a part of the containment vessel and holding the reactor pressure vessel; a pedestal connected to the base mat and supporting the reactor pressure vessel through a vessel skirt and a vessel support; a wet well constituting a part of the containment vessel, the wet well being provided around the pedestal, holding a suppression pool in a lower part thereof, and having a wet well gas phase at an upper part thereof, LOCA vent pipes provided in a sidewall of the pedestal and connecting the dry well to the suppression pool; a lower dry well which is a space in the dry well, is located below the vessel skirt and the reactor pressure vessel and is surrounded by the sidewall of the hollow cylindrical pedestal and the part of the base mat, which lies inside the sidewall of the pedestal; control rod drives provided in the lower dry well and connected to a lower part of the reactor pressure vessel; and a control rod drive handling equipment provided in the lower dry well and below the control rod drives; the core catcher comprising: a main body including: a distributor arranged on the part of the base mat in the lower dry well, a basin arranged on the distributor, cooling channels arranged on a lower surface of the basin, having inlets connected to the distributor and extending in radial directions, and a riser connected to outlets of the cooling channels and extending upward in vertical direction; a lid connected to an upper end of the riser and covering the main body; a cooling water injection pipe open, at one end, to the suppression pool, penetrating the sidewall of the pedestal, connected at another end to the distributor, and configured to supply pool water to the distributor; and chimney pipes connected, at one end, to the riser, penetrating the sidewall of the pedestal, another end being located above the upper end of the riser and submerged and open in the pool water at a level lower than a minimum water level at a time of an accident, wherein the upper ends of the main body and the lid are at heights lower than lower end of the control rod drive handling equipment, as measured from upper end of the base mat.

According to another embodiment, there is presented a boiling water nuclear power plant comprising: a base mat; a reactor building built on a part of the base mat; a containment vessel provided in the reactor building, built on the base mat and having a total height of not exceeding 29.5 m to a lower end of a top slab; a core; a reactor pressure vessel holding the core; a dry well constituting a part of the containment vessel and holding the reactor pressure vessel; a pedestal connected to the base mat and supporting the reactor pressure vessel through a vessel skirt and a vessel support; a wet well constituting a part of the containment vessel, the wet well being provided around the pedestal, holding a suppression pool in a lower part thereof, and having a wet well gas phase at an upper part thereof; LOCA vent pipes provided in a sidewall of the pedestal and connecting the dry well to the suppression pool; a lower dry well which is a space in the dry well, is located below the vessel skirt and the reactor pressure vessel and is surrounded by the sidewall of the hollow cylindrical pedestal and the part of the base mat, which lies inside the sidewall of the pedestal; control rod drives provided in the lower dry well and connected to a lower part of the reactor pressure vessel; a control rod drive handling equipment provided in the lower dry well and below the control rod drives; and a core catcher having: a main body including: a distributor arranged on the part of the base mat in the lower dry well, a basin arranged on the distributor, cooling channels arranged on a lower surface of the basin, having inlets connected to the distributor and extending in radial directions, and a riser connected to outlets of the cooling channels and extending upward in vertical direction; a lid connected to an upper end of the riser and covering the main body; a cooling water injection pipe open, at one end, to the suppression pool, penetrating the sidewall of the pedestal, connected at another end to the distributor, and configured to supply pool water to the distributor; and chimney pipes connected, at one end, to the riser, penetrating the sidewall of the pedestal, another end being located above the upper end of the riser and submerged and open in the pool water at a level lower than a minimum water level at a time of an accident, wherein the upper ends of the main body and the lid are at heights lower than lower end of the control rod drive handling equipment, as measured from upper end of the base mat.

First Embodiment

A first embodiment of the present invention will be described with reference to FIG. 1 to FIG. 6. Any components identical to ones shown in FIG. 9 to FIG. 16 are identified by the same numbers in FIG. 1 to FIG. 6, and will not be described repeatedly in the following description.

Figure 2:
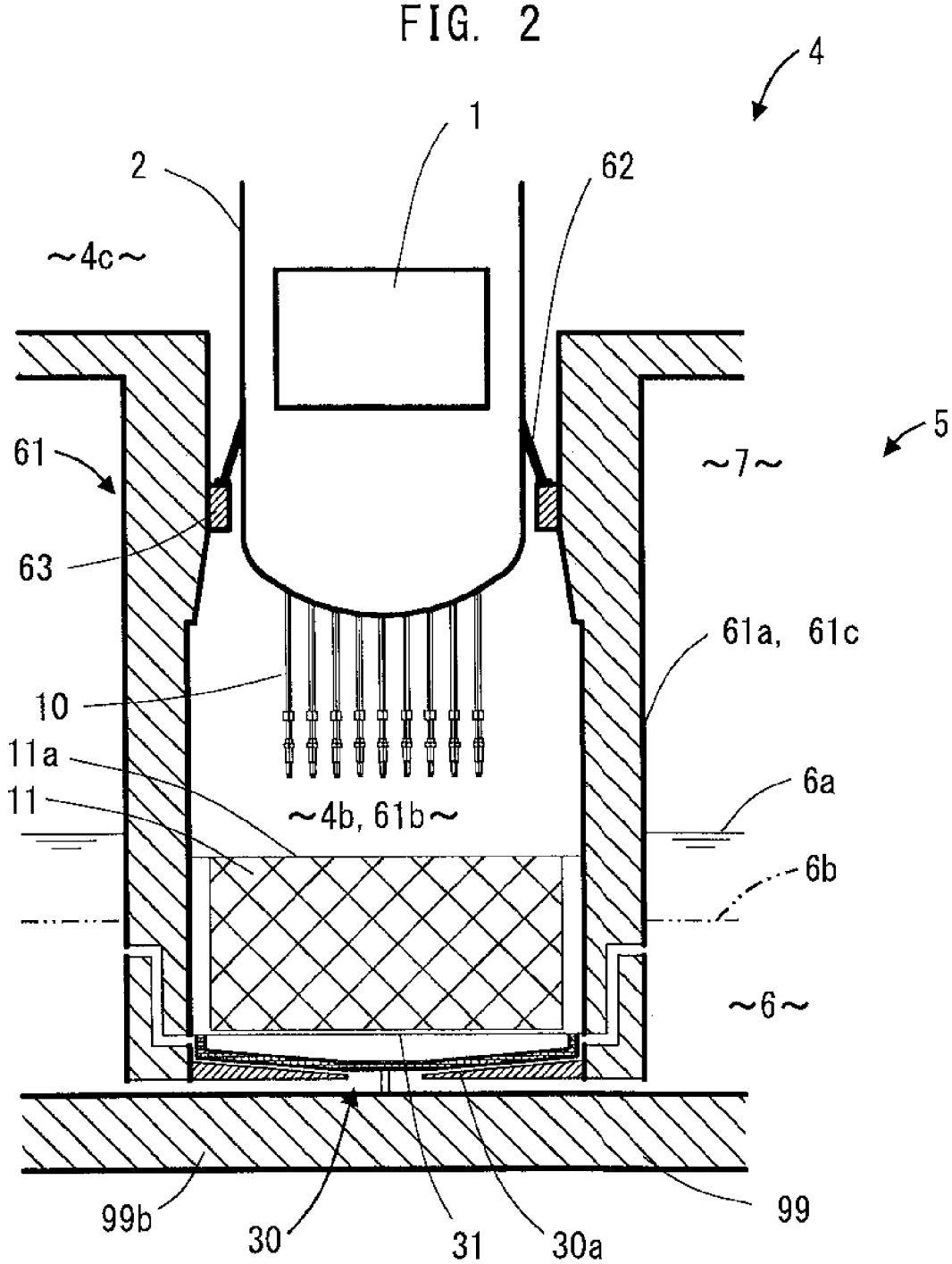
FIG. 2 is an elevational cross-sectional view showing a situation where an embodiment of a core catcher is arranged in a lower dry well.

(Configuration of FIGS. 1 and 2)

FIG. 1 is a sectional view illustrating a situation where a core catcher according to the present invention is arranged in the containment vessel of an ordinary type ABWR. FIG. 2 is an enlarged view showing the position the core catcher takes in the lower dry well 4*b* of the containment vessel 3.

In FIG. 1 and FIG. 2, the main body 30*a* of the core catcher 30 has a height of no more than about 1.6 m. The main body 30*a* of the core catcher 30 is arranged in a space provided by removing that part of a concrete floor 67 (see FIG. 11) having a height of about 1.6 m, at the bottom of the lower dry well 4*b* of the ABWR containment vessel 3. Therefore, none of the heights of the lower dry well 4*b*, the containment vessel 3 and the reactor building 100 are increased by about 2.1 m, unlike in the EU-ABWR. The total height of the containment vessel 3 is about 29.5 m, from the upper end of the part 99*b* of the base mat 99 to the lower end of the top slab 4*a*.

The main body 30*a* of the core catcher 30 is provided below a control rod drive handling equipment 11 (about 1.7 m high), not contacting the lower end of the control rod drive handling equipment 11. A lid 31 is arranged also below the control rod drive handling equipment 11 (about 1.7 m high), not contacting the lower end of the control rod drive handling equipment 11. The upper end of the main body 30*a* of the core catcher 30 and the upper end of the lid 31 are below a height of 1.7 m from the upper end of the part 99*b* of the base mat 99.

Figure 3:
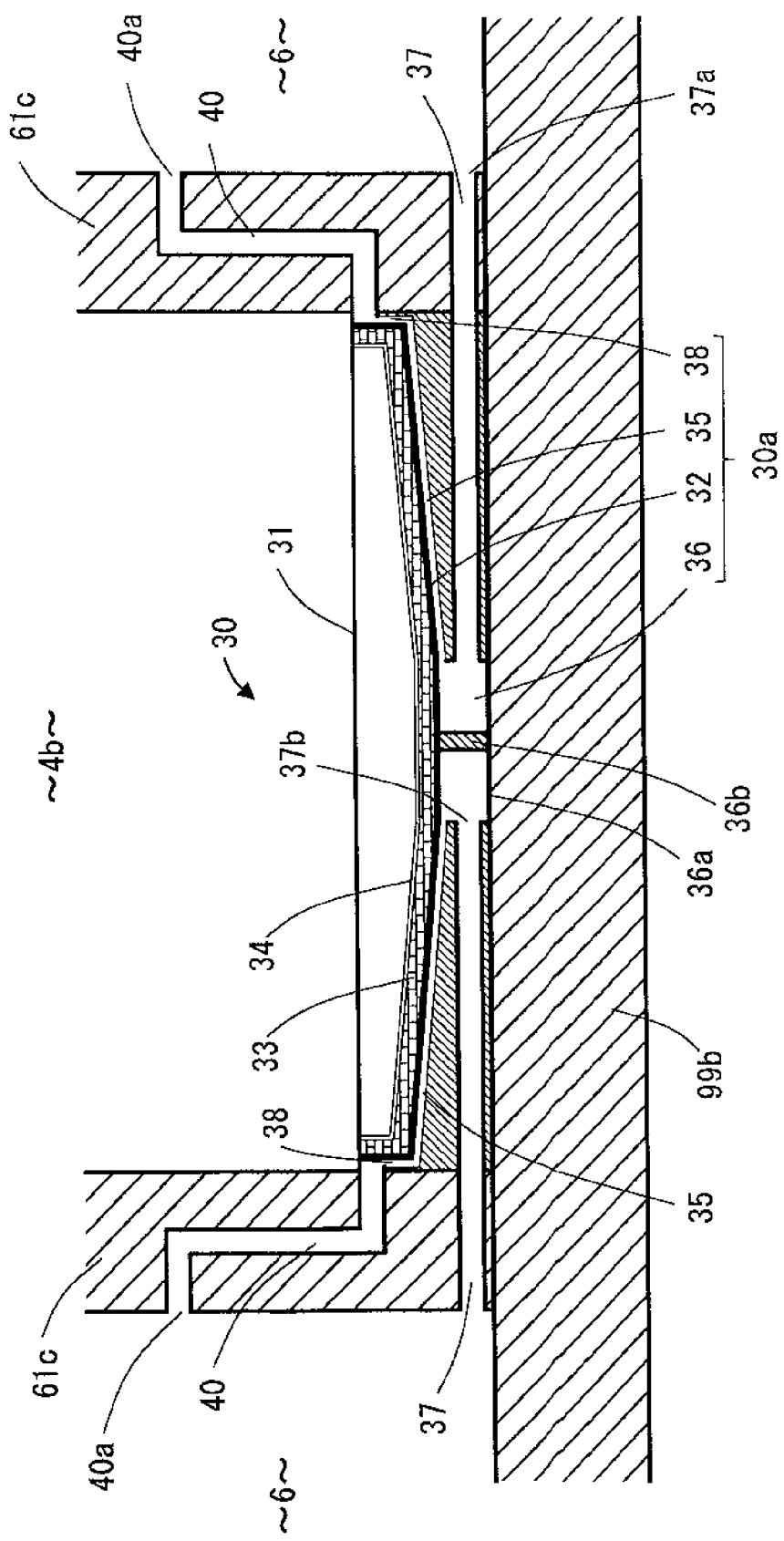
FIG. 3 is an elevational cross-sectional view showing a structure of a first embodiment of a core catcher according to the present invention.

(Configuration of FIG. 3)

The first embodiment of the present invention will be described with reference to FIG. 3 to FIG. 6.

As shown in FIG. 3, the main body 30*a* of the core catcher 30 according to this embodiment includes a basin 32, a distributor 36, cooling channels 35 and a riser 38.

This embodiment differs from the prior-art apparatus in several respects. First, the cooling channels 35 are inclined by, for example, 5 degrees (not 10 degrees as in the prior-art apparatus), and the main body 30*a* of the core catcher 30 is thin, having the total height of no more than about 1.6 m that is less than the height (1.7 m) of the control rod drive handling equipment 11. Second, the lid 31 is provided, contacting the upper end of the main body 30*a* of the core catcher 30 (i.e., the upper end of the riser 38). Third, the lid 31 is provided with no sumps. Fourth, no downcomers are provided. Fifth, the cooling water injection pipe 37 penetrates the vent wall 61*c*, and its distal end opens in the water in the suppression pool 6. Sixth, the upper end of the riser 38 is closed, not open to the upper part of the core catcher 30. Seventh, a chimney pipe 40 is provided and connected at one end to the riser 38. Eighth, the chimney pipe 40 penetrates the vent wall 61*c*, and its distal end opens in the water in the suppression pool 6. Finally, the chimney pipe 40 extends upward to a position higher than the riser 38.

The chimney pipe 40 has an opening 40*a* in the suppression pool 6, at a height which is higher than the height (i.e., about 2.45 m) of the downcomer 39 of the core catcher 30 used in the conventional EU-ABWR and which is lower than the minimum water level (i.e., about 4.46 m to 4.85 m) in the suppression pool 6 in the event of an accident. For example, the upper end of the chimney pipe 40 may lie at a height of about 4 m. The cooling channels may be identical in structure to those shown in, for example, FIG. 16.

Figure 4:
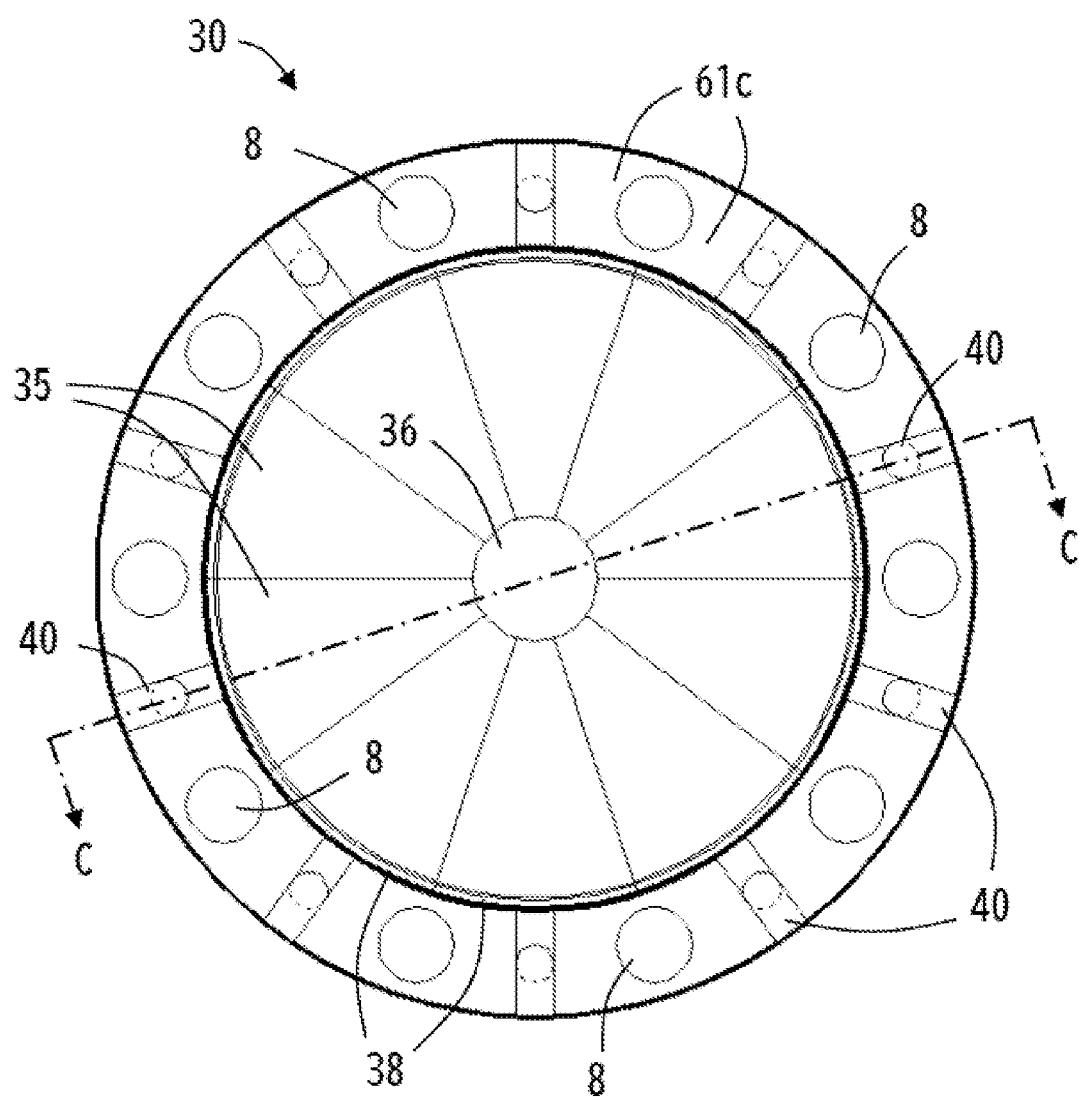
FIG. 4 is a plan view showing the structure of the first embodiment of the core catcher according to the present invention.

FIG. 3 corresponds to a cross-sectional view of FIG. 4 taken along arrow C-C that runs through centers of the chimney pipes 40, but not centers of the LOCA vent pipes 8 (See FIG. 4). Chimney pipes 40 appear in FIG. 3. LOCA vent pipes 8, however, do not appear in FIG. 3 because LOCA vent pipes 8 do not exist on the cross section taken along arrow C-C in FIG. 4. For example, there are ten chimney pipes 40 in FIG. 4 in this embodiment. Therefore, five pieces of arrow C-C can be drawn in FIG. 4 crossing two pairing chimney pipes 40 although only one piece of arrow C-C is drawn for simplicity. FIG. 3 is identical to all the cooling channels 35, cooling water injection pipes 37 and chimney pipes 40 along all pieces of arrow C-C.

(Configuration of FIG. 4)

FIG. 4 is a plan view of a first embodiment of the core catcher according to the present invention. In FIG. 4, the cooling channels 35 are shown as exposed, but none of the lid 31, the sacrificial layer 34 made of concrete, the refractory layer 33 composed of refractory bricks and the basin 32 made of steel plate are not illustrated.

As shown in FIG. 4, the number of cooling channels 35 provided is, for example, 10, and the number of LOCA vent pipes 8 used is, for example, 10. The number of the cooling channels 35 is not limited to 10, nevertheless. If eight LOCA vent pipes 8 are used, 8, 16 or 32 cooling channels 35 may be used in accordance with the cooling ability and structural strength that are desired. The chimney pipes 40 are positioned, not interfering with the LOCA vent pipes 8. In the configuration of FIG. 4, for example, each chimney pipe 40 is provided between two adjacent LOCA vent pipes 8. The chimney pipes 40 are arranged in the vent wall 61c (see FIG. 3).

In the embodiment configured as described above, the cooling water injection pipes 37, the distributor 36, the cooling channels 35, the riser 38 and the chimney pipes 40 are kept communicated with the suppression pool 6 at all times, and always filled with the pool water of the suppression pool 6. During an accident, the pool water is supplied into the cooling channels 35 by virtue of the density difference between the water in the suppression pool 6 and the cooling water flowing in the cooling channels 35, the riser 38 and the chimney pipes 40. The chimney pipes 40 have an opening 40a at a height of about 4 m. Therefore, in each chimney pipe 40 up to about 4 m, exists low density cooling water heated to high temperature by the decay heat of the core debris. The water is vaporized, generating a two phase flow in each chimney pipe 40 in some cases.

On the other hand, low-temperature, high-density water exists in the suppression pool 6 to a height of about 4 m. By virtue of the density difference between the respective water, the cooling water can be supplied into the cooling water injection pipe 37. The water head in the suppression pool 6 is about 4 m, much higher than the water head of about 2.45 m in the downcomer 39 of the conventional EU-ABWR core catcher. Therefore, much larger natural circulation flow rate can be obtained. The suppression pool 6 contains a large amount of pool water and can keep low temperature and high density of cooling water. Therefore, the large natural circulation flow rate can be maintained owing to the large density difference.

A method for maintaining water at low temperature in the suppression pool 6 for a long time in the event of a severe accident may be to supply water from an external water source to the suppression pool 6, or to supply condensate from a passive containment cooling system to the suppression pool 6 (refer to WO2016/002224, the entire content of which is incorporated by reference).

In the conventional core catcher 30, the density difference decreases because the downcomer 39 supplies the low-density, high-temperature water heated by the core debris above the basin 32. Consequently, it was difficult to keep a large flow rate of natural circulation. This problem can be solved in this embodiment.

Further, the core catcher of the embodiment does not use for recirculation the contaminated water existing above the basin 32 that might contain some core debris and loose parts. Hence, it is possible to eliminate the possibility of loss of cooling function due to the clogging of the cooling channels 35 and so on.

Furthermore, since the water is constantly supplied from the suppression pool 6 into the cooling channels 35 during the normal operation, the cooling of the basin 32 can be immediately started in an accident, even if the sacrificial layer 34 and the refractory layer 33 are damaged by an impact of core debris drop. Once the temperature of the basin 32 rises, the cooling water existing in the cooling channels 35 before the accident starts cooling the basin 32 naturally, and the cooling water is stably supplied thereafter by virtue of natural circulation.

Thanks to the above cooling mechanism, the sacrificial layer 34 and the refractory layer 33 may be eliminated in the core catcher of this embodiment. The core debris existing above the core catcher 30 is cooled with the cooling water supplied from the lower dry well flooding pipes 65 through the fusible valves 64 that have been melted open (see FIG. 14).

Since the chimney pipes 40 provide a water head of, for example, 4 m, the heights of the basin 32 and the riser 38 need not be increased. The main body 30a of the core catcher 30 can therefore be thin (or low in height). Hence, it is possible to provide a core catcher that can be arranged in the space with about 1.6 m height at the bottom of the lower dry well 4b, where is the only available space for the conventional ABWR to install a core catcher.

Variations of the first embodiment of the present invention will be described with reference to FIG. 5 and FIG. 6.

Figure 5:
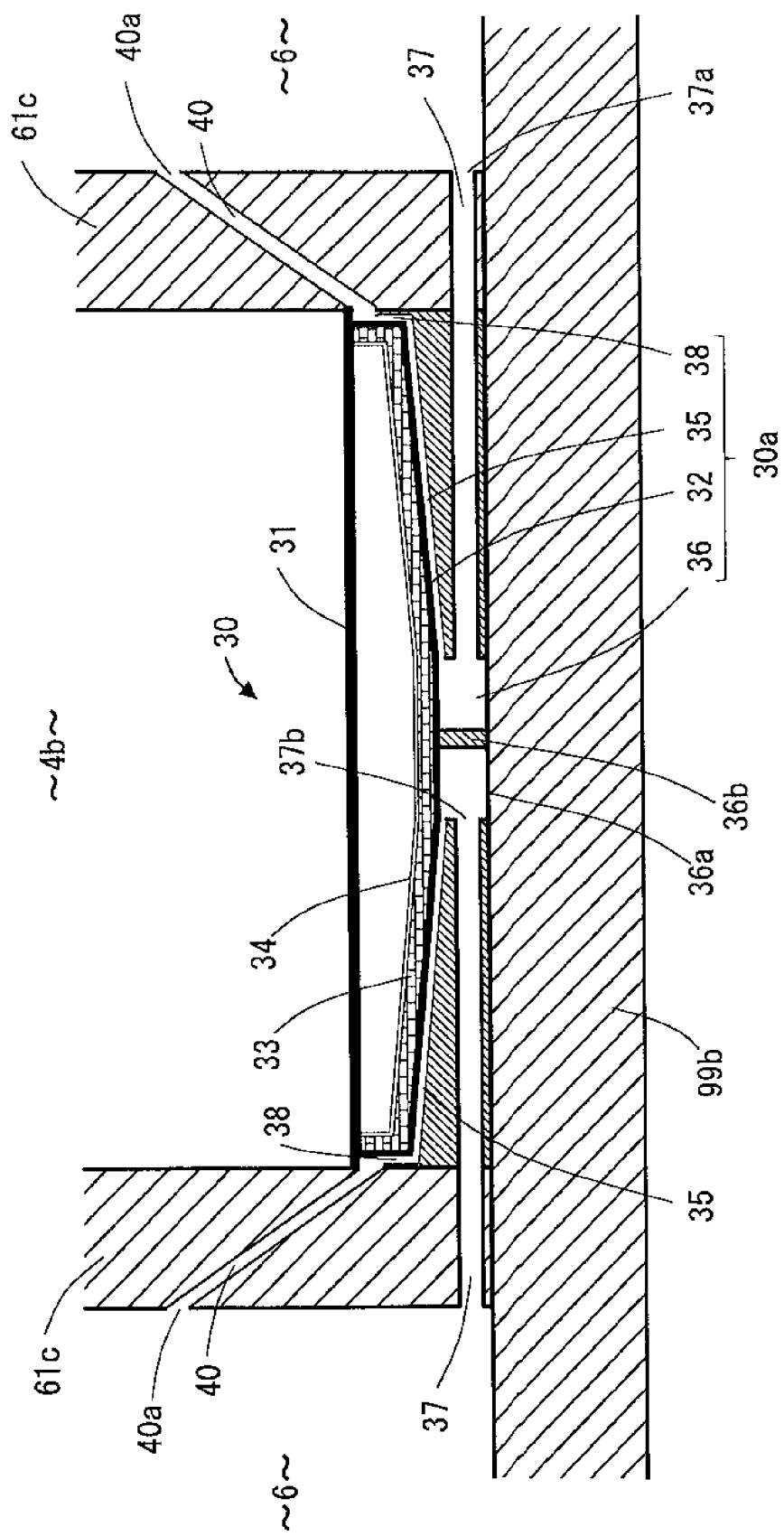
FIG. 5 is an elevational cross-sectional view showing a structure of a modification of the first embodiment of a core catcher according to the present invention.

(Configuration of FIG. 5)

As shown in FIG. 5, the chimney pipes 40 penetrate the pedestal sidewall 61a, each extending upward and slantwise. So shaped, the chimney pipes 40 have no elbow parts, reducing the flow resistance and increasing the natural flow rate of the cooling water. Alternatively, the chimney pipes 40 can have a smaller diameter for the same reason.

Figure 6:
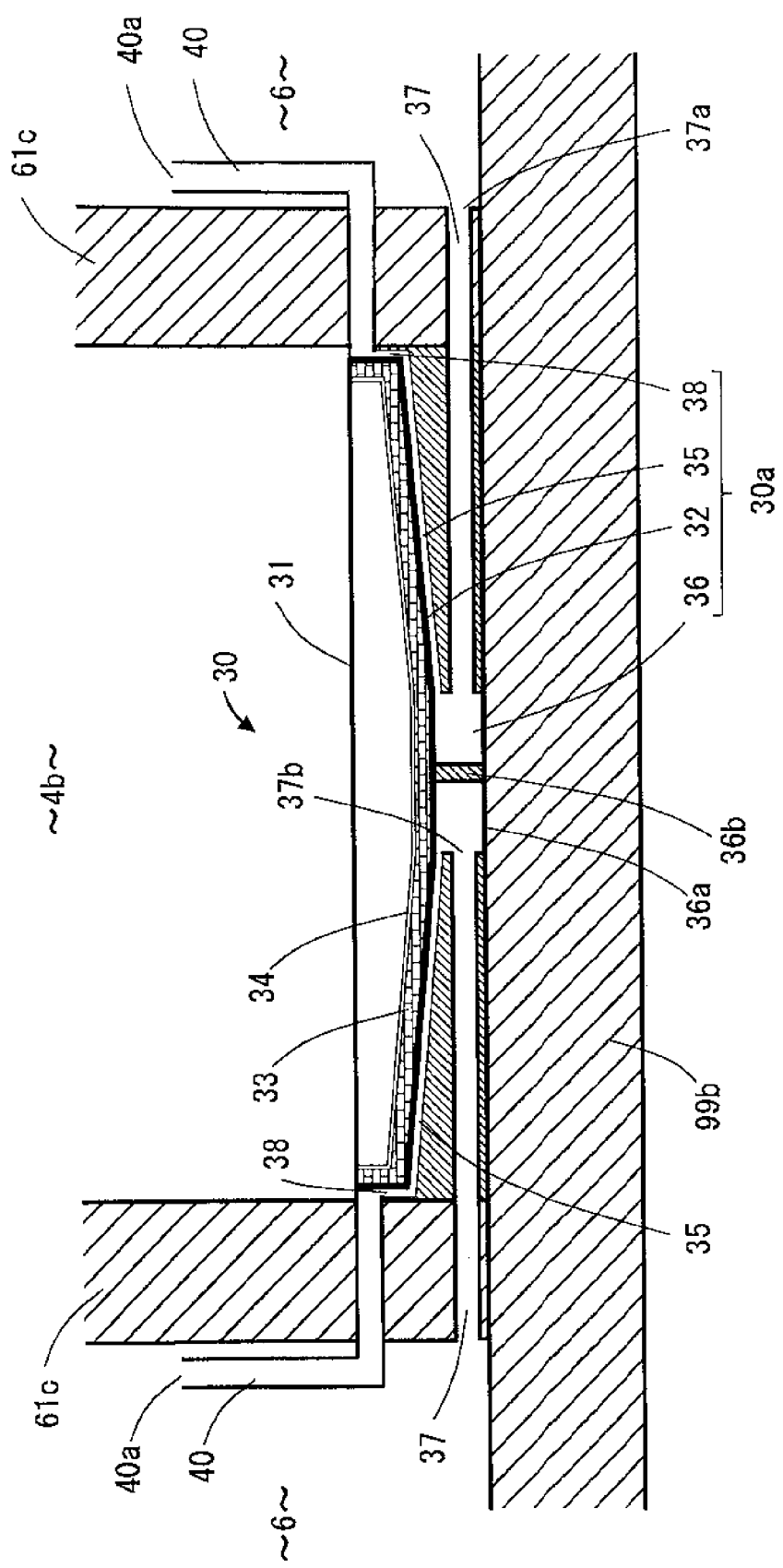
FIG. 6 is an elevational cross-sectional view showing a structure of another modification of the first embodiment of a core catcher according to the present invention.

(Configuration of FIG. 6)

As shown in FIG. 6, the chimney pipes 40 penetrate the pedestal sidewall 61a in horizontal direction and then extend upward in the suppression pool 6. So shaped, the chimney pipes 40 have less elbow parts than otherwise. In addition, as they do not extend upward in the pedestal sidewall 61a the chimney pipes 40 can be installed more easily.

Second Embodiment

A second embodiment of the core catcher according to the present invention will be described with reference to FIG. 7 and FIG. 8.

Figure 7:
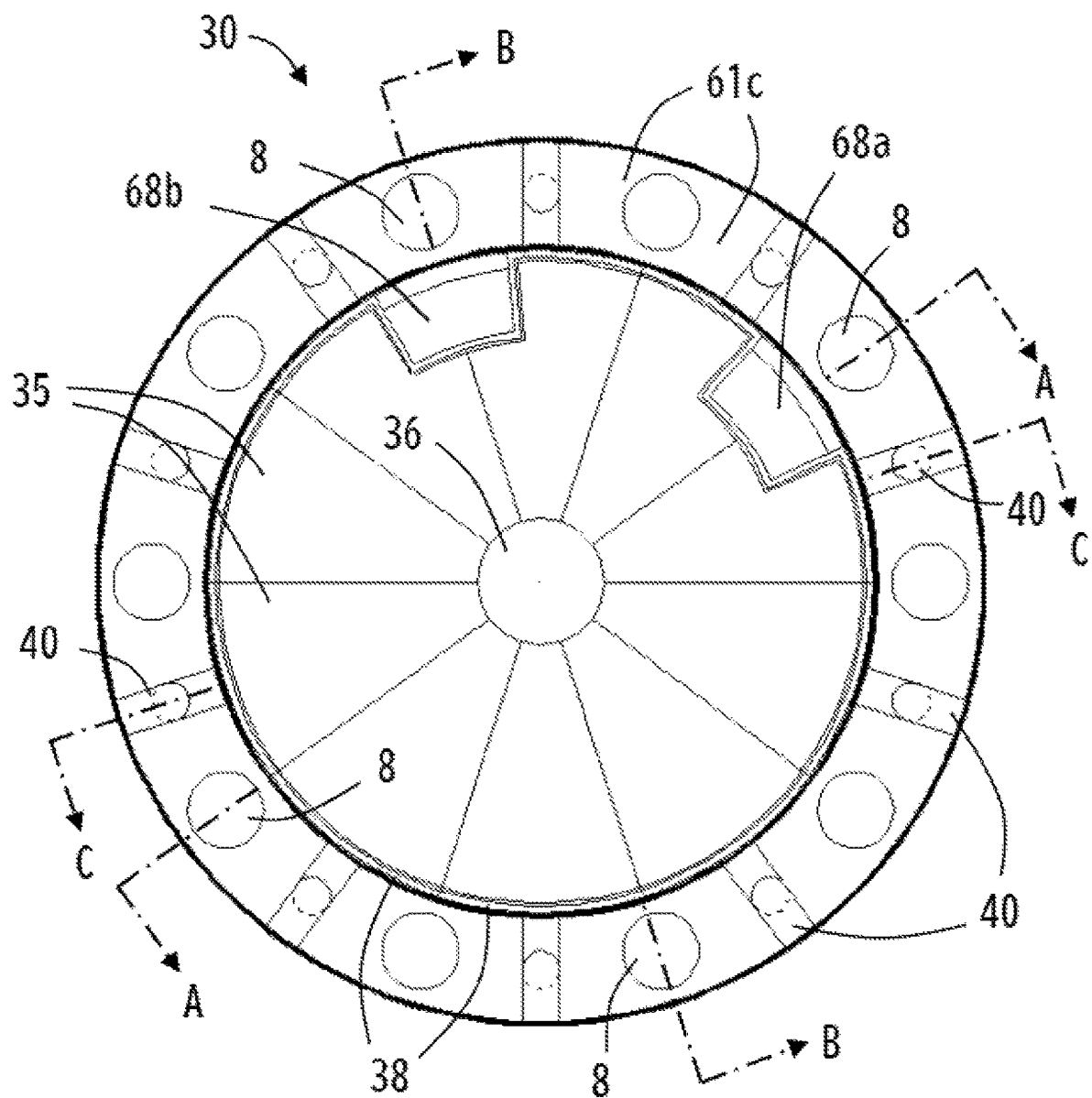
FIG. 7 is a plan view showing a structure of a second embodiment of a core catcher according to the present invention.

(Configuration of FIG. 7)

FIG. 7 is a plan view outlining the second embodiment of the core catcher according to the present invention.

As shown in FIG. 7, two sumps 68, i.e., a high conductivity waste sump 68a and a low conductivity waste sump 68b, are arranged. In the vicinity of the sumps 68, a lid 31, a basin 32, a refractory layer 33, a sacrificial layer 34, cooling channels 35, channel sidewalls 35a, a riser 38, and chimney pipes 40 are configured to avoid interference with the sumps 68a and 68b and surround the peripheries of the sumps 68. The sumps 68a and 68b have a corium shield (not shown) each. In this embodiment, the core catcher 30 can be arranged without interfering with the sumps 68a and 68b.

Figure 8:
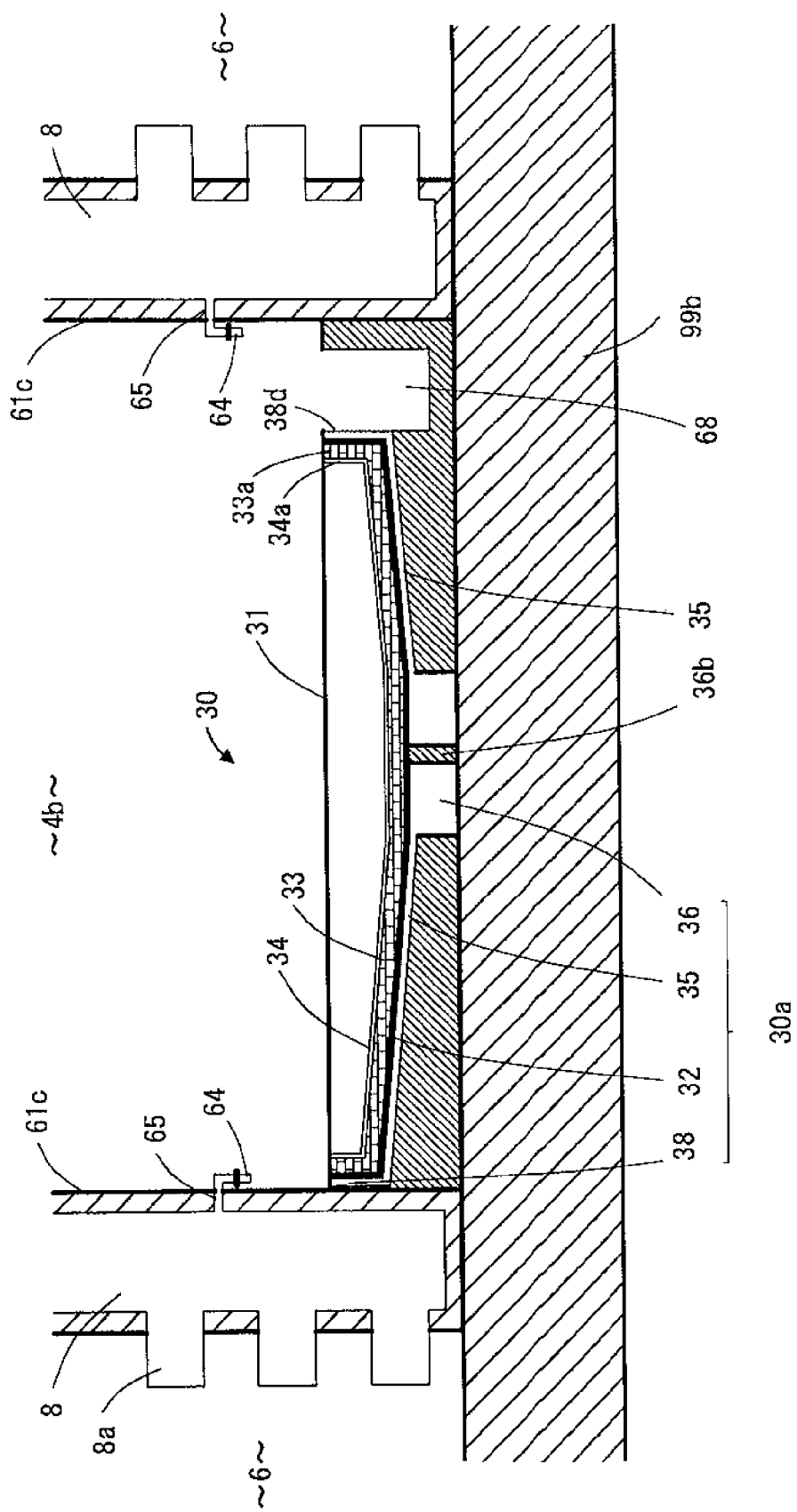
FIG. 8 is an elevational cross-sectional view showing the structure of the second embodiment of the core catcher according to the present invention.
Figure 9:
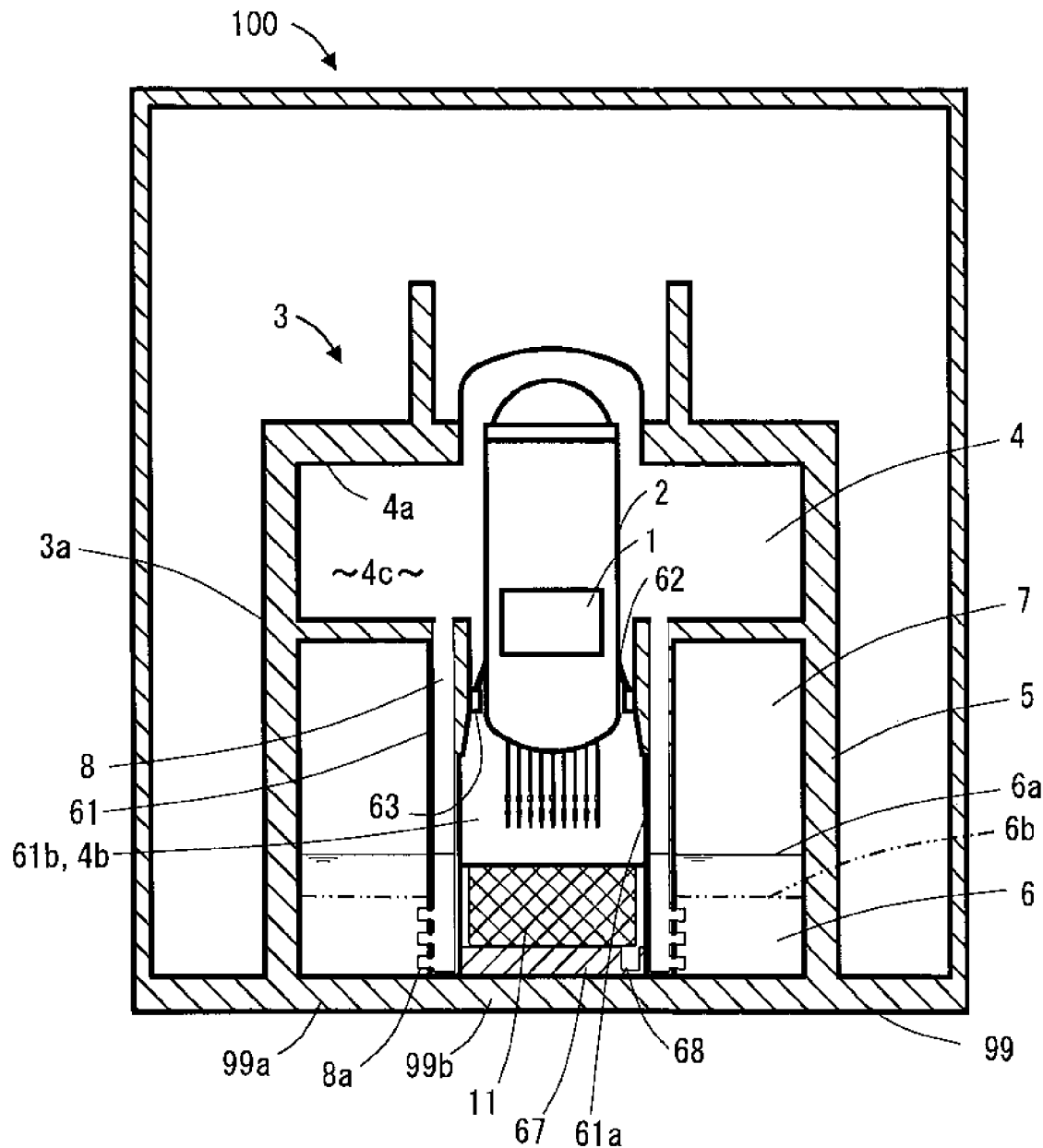
FIG. 9 is an elevational cross-sectional view of a containment vessel of a conventional ABWR.
Figure 10:
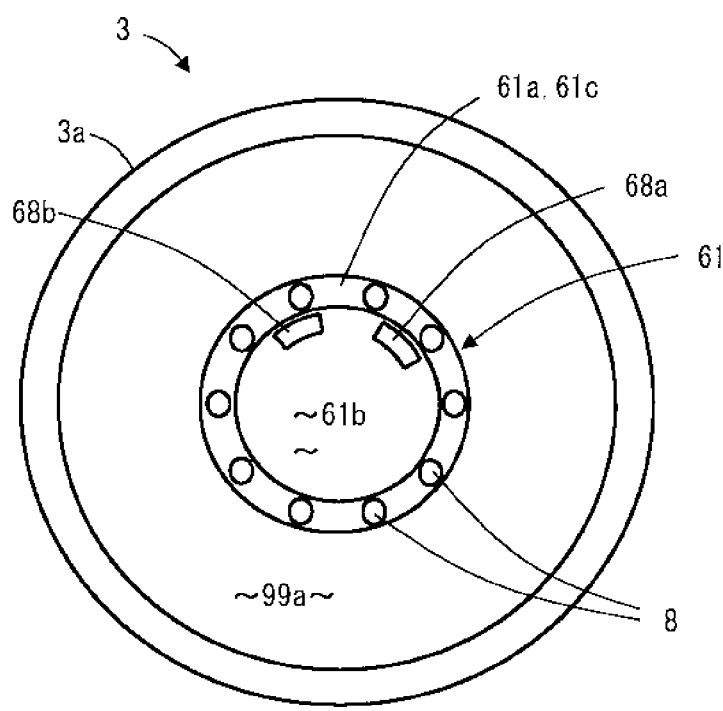
FIG. 10 is a plan view of the containment vessel of the conventional ABWR.
Figure 11:
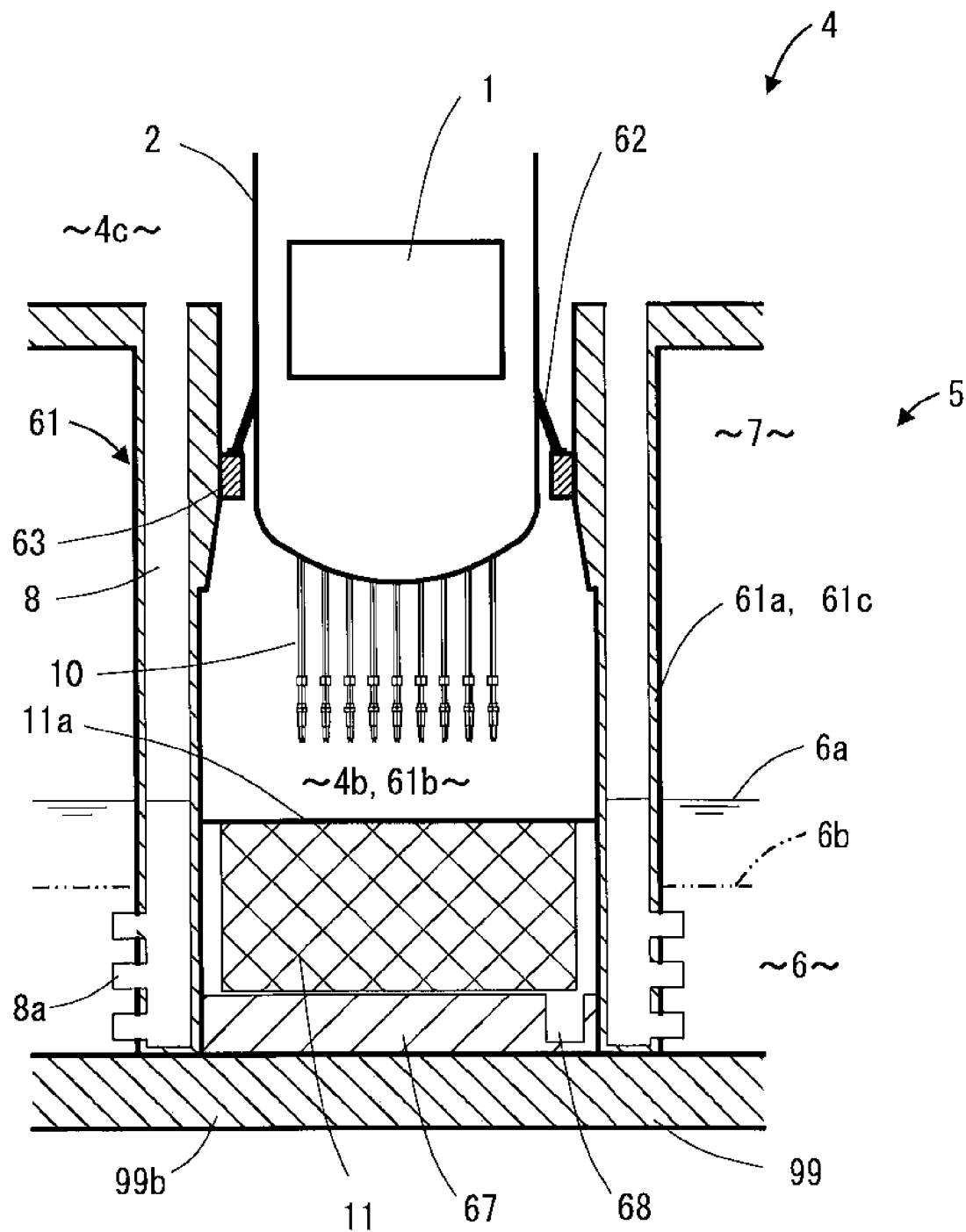
FIG. 11 is an elevational cross-sectional view showing a structure of a control rod drive handling equipment and a concrete floor in a containment vessel (lower dry well) of a conventional ABWR.
Figure 12:
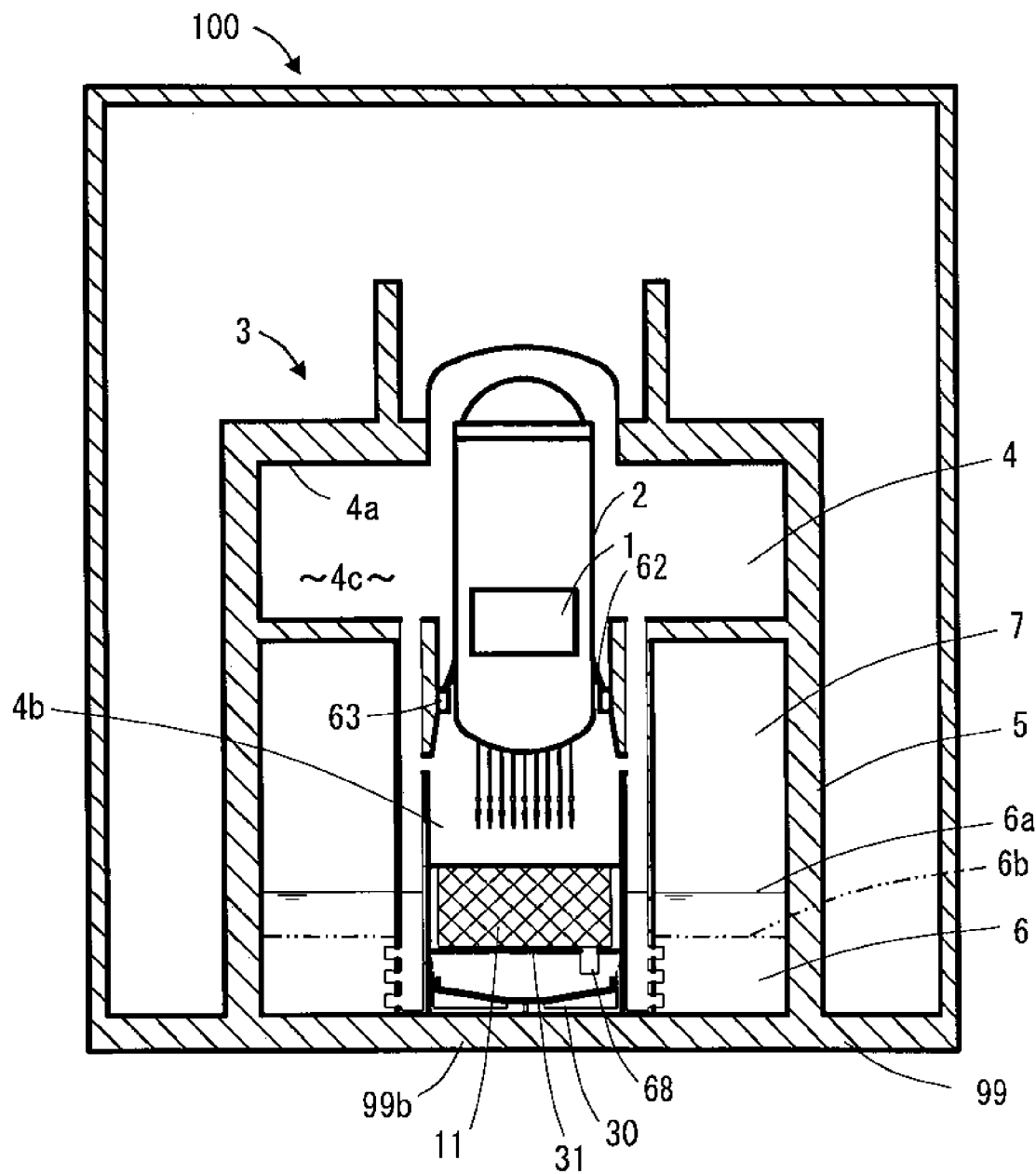
FIG. 12 is an elevational cross-sectional view showing a structure of a containment vessel of a conventional EU-ABWR.
Figure 13:
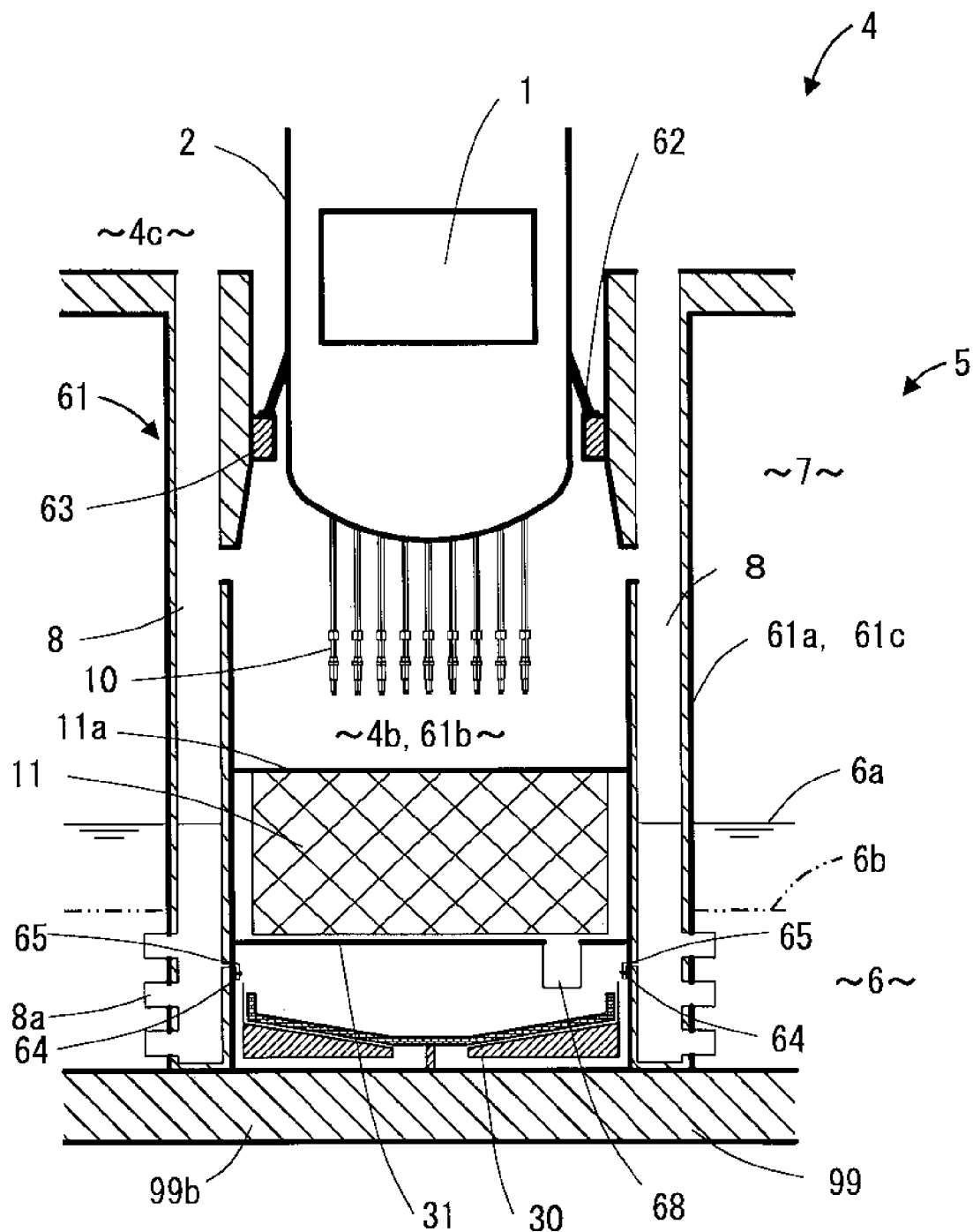
FIG. 13 is an elevational cross-sectional view showing a situation where a control rod drive handling equipment and a core catcher are arranged in the containment vessel (lower dry well) of the conventional EU-ABWR
Figure 14:
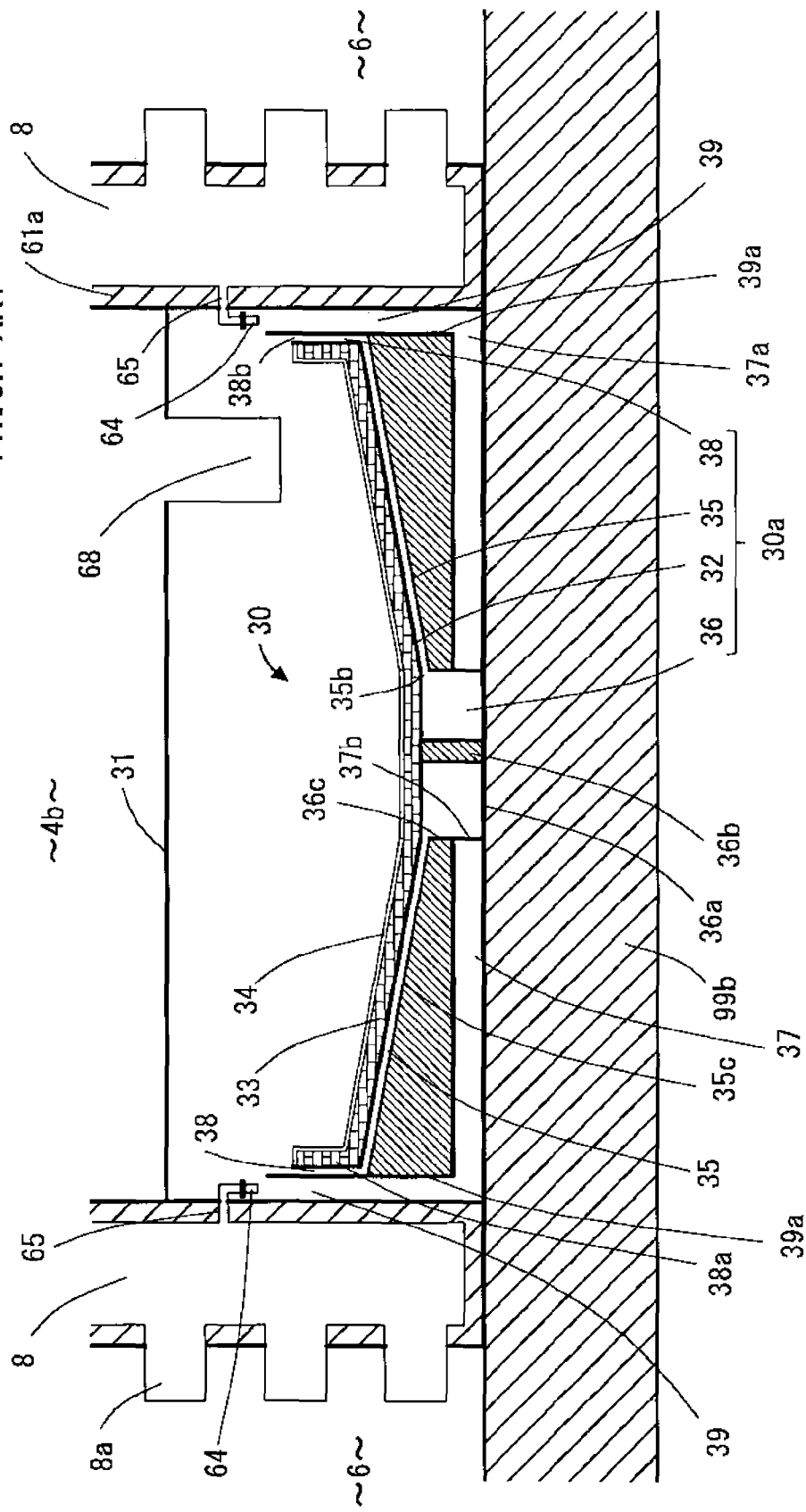
FIG. 14 is an elevational cross-sectional view showing the structure of the core catcher of the conventional EU-ABWR.
Figure 15:
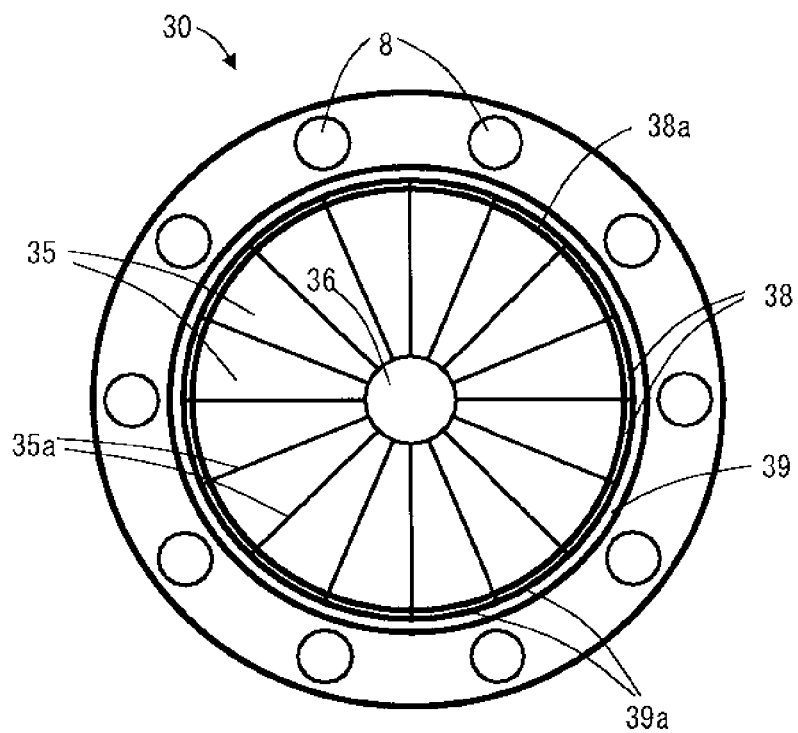
FIG. 15 is a plan view showing the structure of the core catcher of the conventional EU-ABWR.
Figure 16:
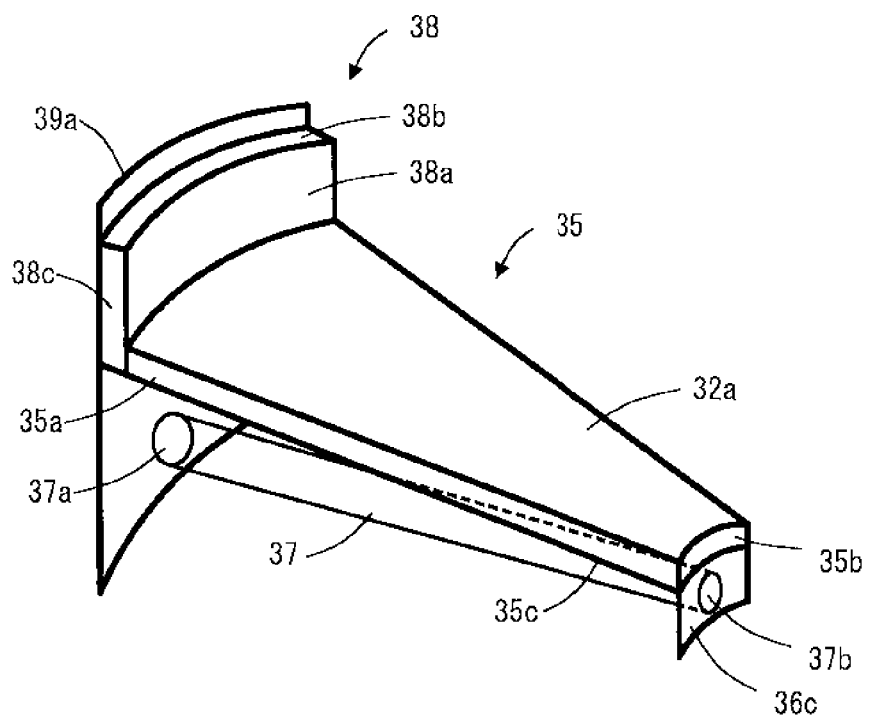
FIG. 16 is a perspective view of one of a cooling channel of the core catcher of the conventional EU-ABWR.

(Configuration of FIG. 8)

FIG. 8 is an elevational sectional view outlining the second embodiment of the core catcher according to the present invention. FIG. 8 corresponds to a cross-sectional view of FIG. 7 taken along arrows A-A and B-B that run through centers of LOCA vent pipes 8 (See FIG. 7). LOCA vent pipes 8 appear in FIG. 8. Chimney pipes 40 and cooling water injection pipes 37, however, do not appear in FIG. 8 because they do not exist on the cross sections. Chimney pipes 40 and cooling water injection pipes 37 rather exist on the cross section taken along arrow C-C of FIG. 7 (See FIG. 7). A cross-sectional view of FIG. 7 taken along arrow C-C is exactly the same as FIG. 3. For example, there are ten chimney pipes 40 in FIG. 7 in this embodiment. Therefore, five pieces of arrow C-C can be drawn in FIG. 7 crossing two pairing chimney pipes 40 although only one piece of arrow C-C is drawn for simplicity. FIG. 3 is identical to all the cooling channels 35, cooling water injection pipes 37 and chimney pipes 40 along all pieces of arrow C-C also in the second embodiment (See FIG. 3).

A sump riser 38d, a sump refractory layer 33a, and a sump sacrificial layer 34a are arranged along the sidewall of the sump 68. The core catcher 30 can therefore be arranged without interfering with the sumps 68a and 68b.

Other Embodiments

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A core catcher for use in a boiling water nuclear plant which has:
    a base mat;
    a reactor building built on a part of the base mat;
    a containment vessel provided in the reactor building, built on the base mat and having a total height of not exceeding 29.5 m to a lower end of a top slab;
    a core;
    a reactor pressure vessel holding the core;
    a dry well constituting a part of the containment vessel and holding the reactor pressure vessel;
    a pedestal connected to the base mat and supporting the reactor pressure vessel through a vessel skirt and a vessel support;
    a wet well constituting a part of the containment vessel, the wet well being provided around the pedestal, holding a suppression pool in a lower part thereof, and having a wet well gas phase at an upper part thereof;
    LOCA vent pipes provided in a sidewall of the pedestal and connecting the dry well to the suppression pool;
    a lower dry well which is a space in the dry well, is located below the vessel skirt and the reactor pressure vessel and is surrounded by the sidewall of the hollow cylindrical pedestal and the part of the base mat, which lies inside the sidewall of the pedestal;
    control rod drives provided in the lower dry well and connected to a lower part of the reactor pressure vessel; and
    a control rod drive handling equipment provided in the lower dry well and below the control rod drives;
    the core catcher comprising:
        a main body including:
            a distributor arranged on the part of the base mat in the lower dry well, a basin arranged on the distributor,
            cooling channels arranged on a lower surface of the basin, having inlets connected to the distributor and extending in radial directions, and
            a riser connected to outlets of the cooling channels and extending upward in vertical direction;
        a lid connected to an upper end of the riser and covering the main body;
        a cooling water injection pipe connected at an inlet end to the suppression pool, penetrating the sidewall of the pedestal, connected at an outlet end to the distributor, and configured to supply suppression pool water to the distributor; and
        chimney pipes connected at an inlet end to the riser, penetrating the sidewall of the pedestal, and having an outlet end located above the upper end of the riser and submerged in the suppression pool water at a level lower than a minimum water level at a time of an accident,
        wherein the upper ends of the main body and the lid are at heights lower than lower end of the control rod drive handling equipment, as measured from upper end of the base mat,
        wherein the cooling water injection pipe, the distributor, the cooling channels, the riser and the chimney pipes are kept communicated with the suppression pool at all times, and always filled with the suppression pool water, the core catcher further comprising:
        a sump; and
        a sump riser extending upward along a sidewall of the sump, wherein
        the basin and parts of the cooling channels surround the peripheries of the sump in conformity with a shape of the sump.

2. The core catcher according to claim 1, wherein a refractory layer is provided along an upper surface of the basin and along a side of the riser.

3. The core catcher according to claim 2, wherein a sacrificial layer is provided along the refractory layer.

4. The core catcher according to claim 1, wherein the upper ends of the main body and the lid are positioned lower than a level 1.7 m above the upper end of the base mat.

5. The core catcher according to claim 4, wherein a refractory layer is provided along an upper surface of the basin and along a side of the riser.

6. The core catcher according to claim 5, wherein a sacrificial layer is provided along the refractory layer.

* * * * *